(12) United States Patent  
Schlipper

(10) Patent No.: US 8,365,365 B2
(45) Date of Patent: Feb. 5, 2013

(54) HOOK FASTENER WITH SPRING CLOSURE

(76) Inventor: Robert Wesley Schlipper, Hong Kong (HK)

( * ) Notice: Subject to any disclaimer, the term of this patent is extended or adjusted under 35 U.S.C. 154(b) by 466 days.

(21) Appl. No.: 12/460,244

(22) Filed: Jul. 16, 2009

(65) Prior Publication Data

US 2011/0010896 A1    Jan. 20, 2011

(51) Int. Cl.
    *A44B 21/00*   (2006.01)
    *A44B 13/02*   (2006.01)
(52) U.S. Cl. ..................... 24/265 H; 24/600.8
(58) Field of Classification Search ........................ None
    See application file for complete search history.

(56) References Cited

U.S. PATENT DOCUMENTS

| | | | | |
|---|---|---|---|---|
| 4,372,016 | A | * | 2/1983 | LaViolette et al. .......... 24/600.7 |
| 4,724,587 | A | * | 2/1988 | Foy ................................. 24/656 |
| 2007/0294867 | A1 | * | 12/2007 | Lin .............................. 24/600.4 |

* cited by examiner

*Primary Examiner* — Jack W. Lavinder

(57) ABSTRACT

In a hook fastener having a sliding closure for closing the mouth of the hook, a keeper prevents opening of the closure. The hook fastener includes a body having a base portion and a hook portion extending from an end of the base portion to define a gap between the hook and the base portion. An opening formed in the base portion has an elongate mouth intersecting an external face on the base portion. The closure includes a shaft part and a grip part, the shaft part received in the opening, the grip part protruding from the shaft part through the mouth for manipulation by a user. A spring urges the closure such that the shaft part extends out of the opening into the gap. The keeper is received to rotate upon the external face, being located between the grip part and abutment on the body. A slot in the keeper extends parallel to the mouth, the keeper preventing the user retracting the closure from the gap, except when the slot is rotated so as to be angularly aligned with the mouth.

5 Claims, 5 Drawing Sheets

HOOK FASTENER WITH SPRING CLOSURE

TECHNICAL FIELD

The present invention relates to a hook fastener for connecting a belt, such as a sling of a camera, shoulder belt of a bag, or another type of belt, and a connecting device such as a ring.

BACKGROUND OF THE INVENTION

A hook fastener with a spring closure is commonly used for engaging a ring or a fitting on a bag, camera, or the like, for attaching a belt. By releasably fastening the belt in this way, a bag may be provided, for instance, with a detachable shoulder strap or carry handle. A common hook fastener for this application has a sliding closure urged by a spring to close the mouth of the hook.

To provide some degree of security when leaving a bag briefly unattended the user may loop a releasably fastened shoulder strap about a piece of furniture, or the like. This simple technique can be performed quickly and without drawing attention and this has been found sufficient to defeat casual theft. Of course for greater security the end of the strap could be fixed to the bag by a lock, however a lock would add considerable cost and weight to the fastener. It will be understood, therefore, that there is a need for a hook fastener for such an application that is able to provide improved deterrence of casual theft, without substantially increasing the cost of the fastener. It is an object of the present invention to overcome to address this need or, more generally, to provide an improved hook fastener.

DISCLOSURE OF THE INVENTION

According to one aspect of the present invention there is provided a hook fastener comprising:

a body having a base portion and a hook portion extending from an end of the base portion to define a gap between the hook and the base portion;

an external face on the base portion;

an abutment on, or fastened to, the body to project from the external face;

an opening formed in the base portion, the opening having an elongate mouth intersecting the external face;

a closure having a shaft part and a grip part, the shaft part received in the opening, the grip part protruding from the shaft part through the mouth for manipulation by a user;

a spring urging the closure such that the shaft part extends out of the opening into the gap, and a keeper received to rotate upon the external face, the keeper being located between the abutment and grip part, a slot in the keeper extending parallel to the mouth, the keeper preventing the user retracting the closure from the gap, except when the slot is angularly aligned with the mouth.

Preferably the keeper is formed of resilient material and has an inner surface complementary to the external face of the base portion, and at least one projection extending radially inwardly of the inner surface, each projection being configured for receipt in the mouth thereby providing a detent for locating the keeper in an angular position in which it prevents the user retracting the closure from the gap.

Preferably the projection and mouth have first respective edges which substantially abut to restrict rotation of the keeper relative to the body in a first direction, and second respective edges which substantially abut to restrict relative rotation of the keeper in a second direction opposite the first direction, wherein at least one of the first and second edges is radiused or chamfered relative to the others of the first and second edges.

Preferably the keeper has a penannular form, and the inner surface is part-cylindrical.

Preferably the keeper further includes a part-cylindrical outer surface and a tab projecting from the outer surface for providing a handle. Preferably one of said projections is angularly aligned with the tab.

Preferably the keeper has inner and outer end surfaces disposed proximate the abutment face and grip part respectively, and wherein a nub projects from the outer surface to abut the grip part and restrict rotation of the keeper.

Optionally a plurality of slotted keepers may be mounted for rotation on the external face.

This invention provides a device which effectively and efficiently provides a degree of casual security for hook fasteners and it has a simple design which minimises manufacturing costs.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
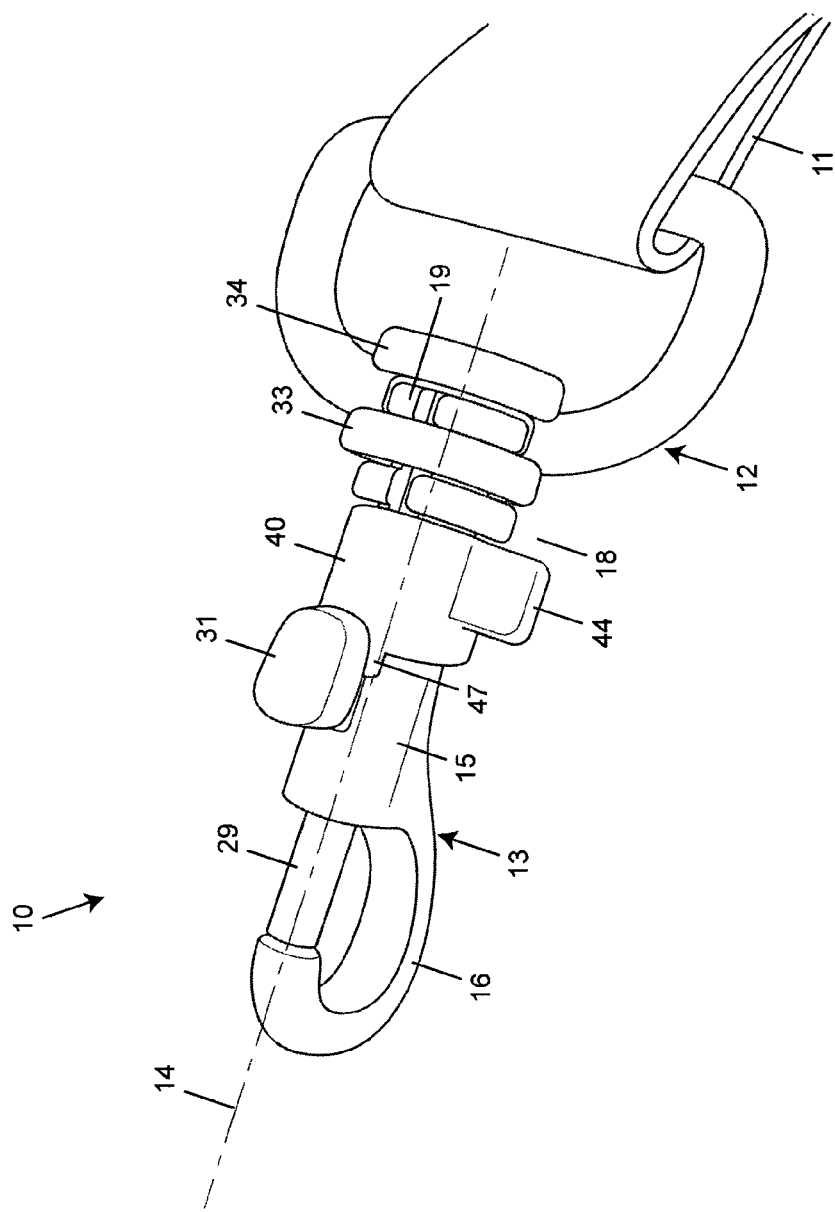
FIG. 1 is a perspective view of hook fastener according to a first embodiment of the present invention.
Figure 2:
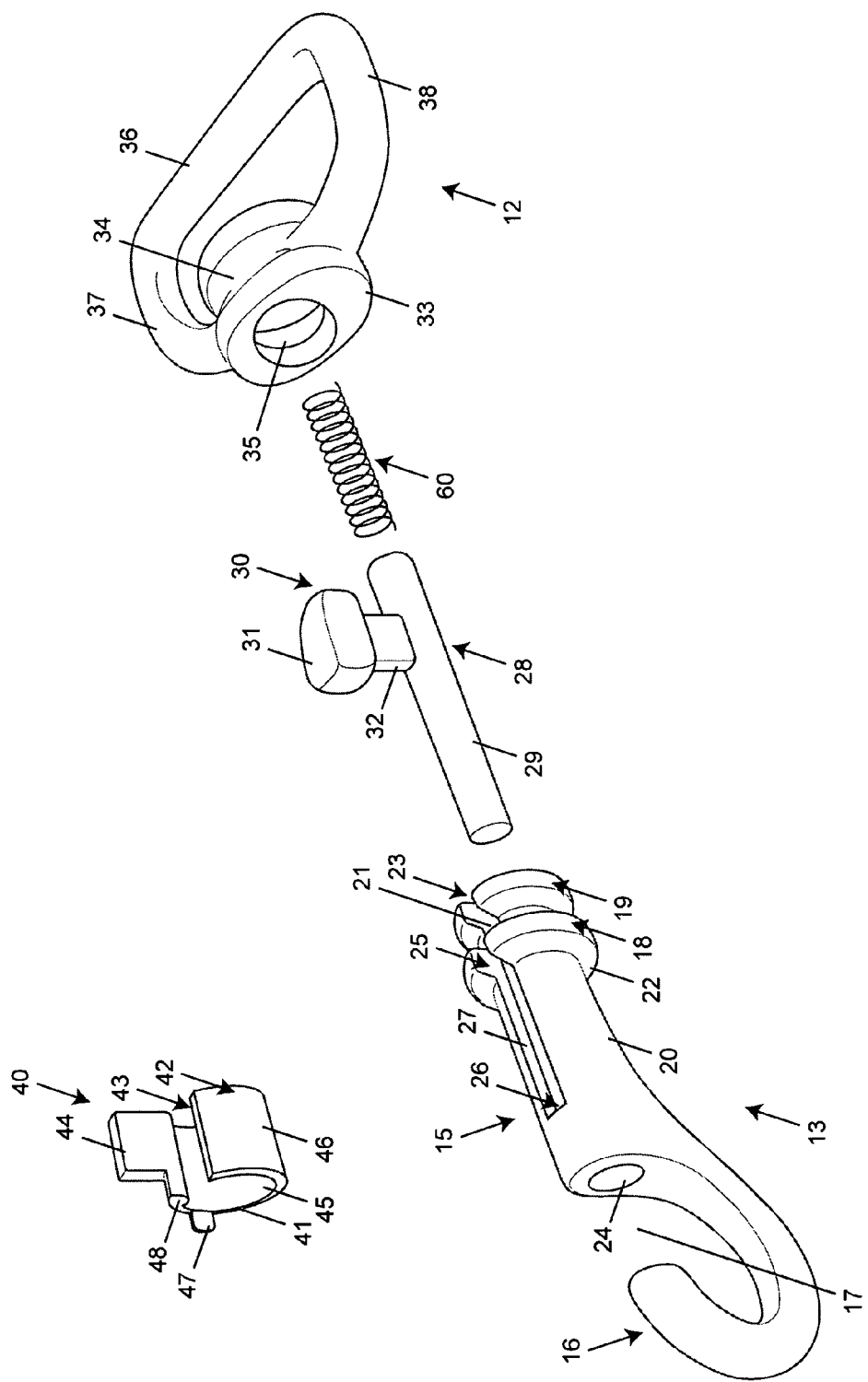
FIG. 2 is an exploded view of the hook fastener of FIG. 1.

Referring to FIGS. 1 and 2 of the drawings a first embodiment of a hook fastener 10 for connecting a belt 11 includes a D-shaped ring coupling 12 to which the belt is connected and a body 13 permanently connected to the ring coupling 12 for relative rotation about an axis 14.

The body 13 includes a base portion 15 and a hook portion 16 extending from a first end of the base portion 15 to define a gap 17 between the hook and the base portions. At a second end of the base portion 15 are inner and outer circumferential ribs 18, 19 disposed generally transversely and spaced longitudinally. The inner rib 18 defines an abutment that projects outwardly from a cylindrical, axially-aligned external face 20 of the base portion 15. Both the ribs 18, 19 project outward from a cylindrical section 21 extending therebetween. The inner rib 18 has a transverse abutment face 22 intersecting the external face 20. An opening 23 extends in the axial direction through the base portion. The opening 23 includes a cylindrical part 24 extending the full length of the base portion 15 and a slot part 25 which intersects with the cylindrical part 24, forming a keyhole-shaped section extending from the second end, through the rib 19, cylindrical section 21 and rib 18 to terminate at transverse end face 26. An elongate mouth 27—formed by the slot part 25—intersects with the external face 20.

A closure 28 has a shaft part 29 complementary to the cylindrical part 24 of the opening 23. A grip 30 includes a bulbous head 31 joined by a neck 32 to the shaft part 29. The neck 32 extends radially and is complementary to the slot part 25.

The D-shaped ring coupling 12 includes a transverse arm section 36 joined by arcuate arms 37, 38 to two transverse flanges 33, 34. An opening 35 in the outer flange 33 is sized to receive the outer rib 19 therethrough and the flanges 33, 34 are axially spaced sufficiently to receive the rib 19 between them.

A keeper 40 moulded from a resilient polymer has a substantially penannular form having parallel end faces 41, 42 lying in respective radial planes. An axial slot 43 extends in the axial direction between the end faces 41, 42. The keeper 40 has coaxial, substantially cylindrical inner and outer faces 45, 46 and a tab 44 projects radially from the outer face 46 on one side of the slot 43. A nub 47 is formed on the radial face 41. Aligned with the inner end of the tab 44, a projection 48 extends inwardly from the cylindrical face 45.

Figure 3:
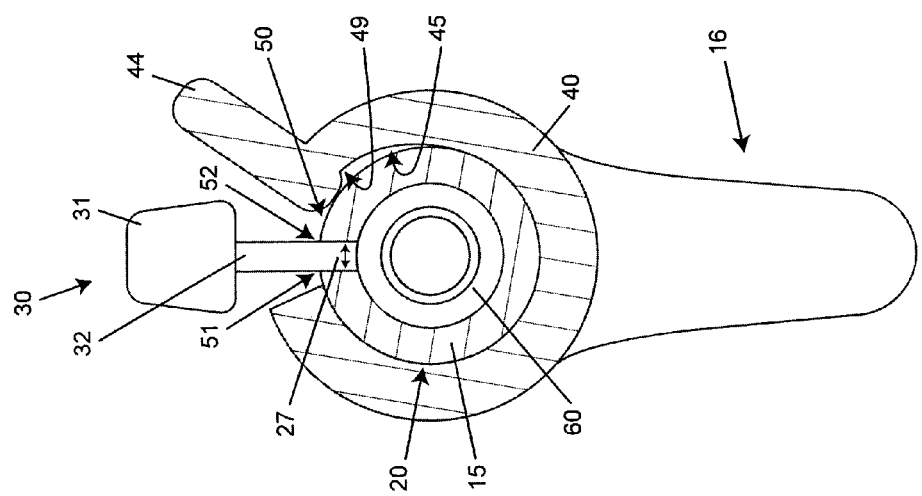
FIG. 3 is a cross section through the hook fastener of FIG. 1.

As shown in FIG. 3, a radiused edge 49 joins the projection 48 to the cylindrical face 45, while the opposing edge 50 of the projection 48, bounding the slot 43, is relatively sharp. Likewise the opposing edges 51, 52 of the mouth 27 are relatively sharp.

To assemble the hook fastener 10, the closure 28 is inserted in the opening 23, sliding the neck 32 through the slot part 25 into the mouth 27. Capturing a helical compression spring 60 between the flange 34 and shaft part 29, the rib 19 is entered through the opening 35 into the space between the flanges 33, 34. The outer flange 33 may then be deformed to permanently connect the base portion 15 and ring coupling 12, while allowing free relative rotation between them. The slot 43 is opened to insert the keeper 40 over the external face 20, between the abutment face 22 and the grip 30.

The spring 60 moves the closure 28 to its closed position, urging the shaft 29 out of the opening into the gap 17 toward the hook portion 16. The grip 30 protrudes through the mouth 27, but before the user can manipulate the grip 30 to open the closure 28 the keeper 40 must be rotated to angularly aligned the slot 43 with the mouth 27 (as shown in FIG. 3) and in all other angular positions the keeper 40 prevents axial movement of the closure 28.

The nub 47 provides a stop surface which abuts the neck 32, providing a limit to rotation of the keeper 40 in a first direction (as shown in FIG. 1). When the tab 44 is rotated in a second direction opposite the first direction generally into axial alignment with the grip 30, the projection 48 is urged into the mouth 27. Further rotation of the keeper in the second direction is resisted by abutment between the relatively sharp edges 50, 51 whereas rotation in the first direction is facilitated by virtue of the radiused edge 49 abutting the edge 52. The projection 48 thus provides a stop or detent limiting rotation of the keeper 40 in a second direction. Therefore, without needing to check visually, or to manually try the closure, the user can ensure that the closure is locked when the keeper 40 is rotated in either direction to the end of its travel.

Figure 4:
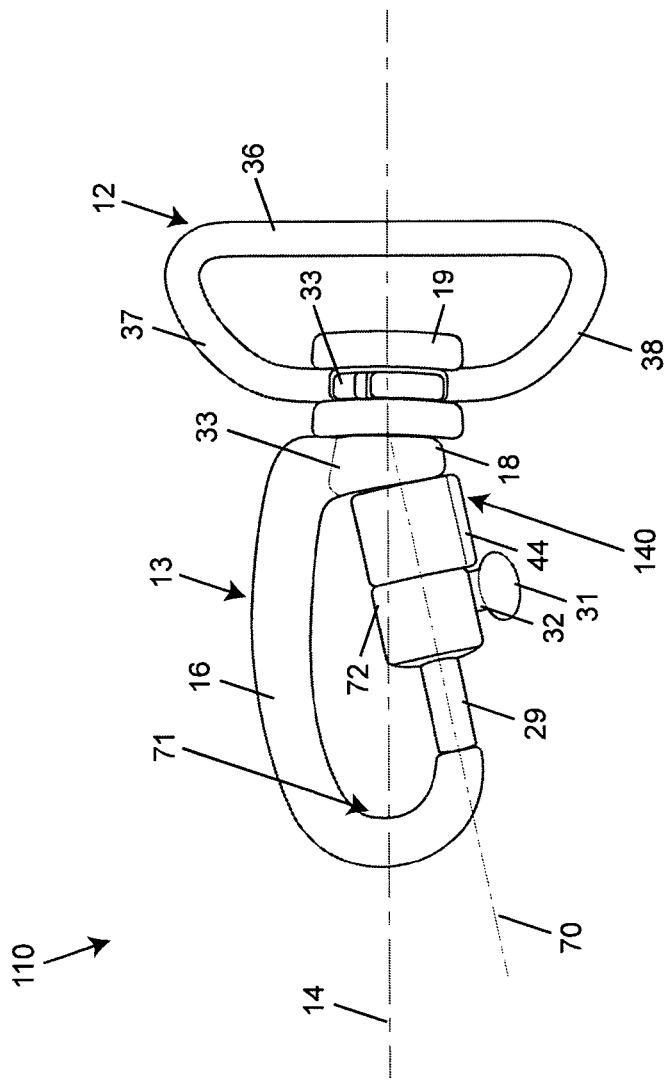
FIG. 4 is a perspective view of hook fastener according to a second embodiment of the present invention.
Figure 5:
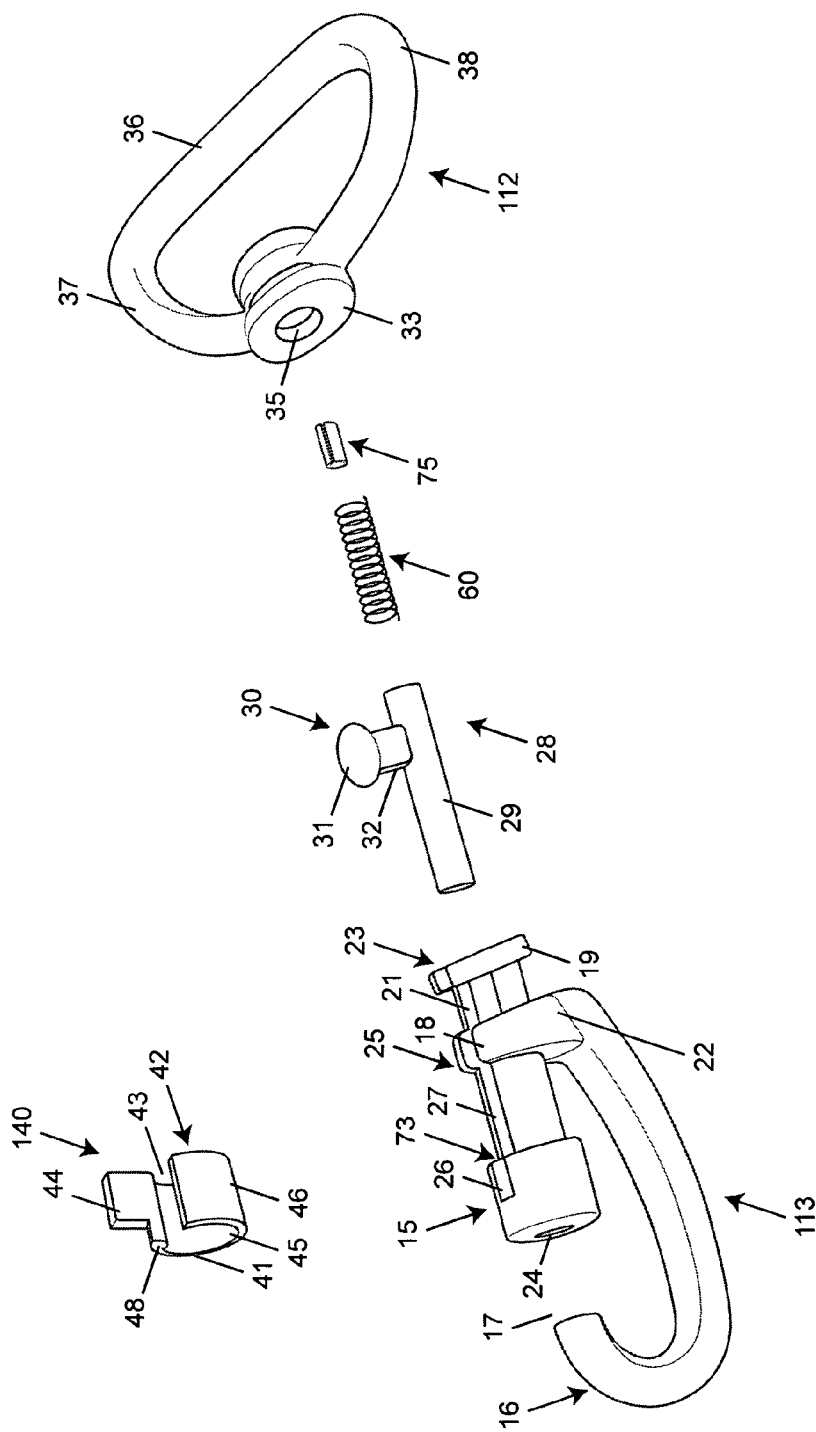
FIG. 5 is an exploded view of the hook fastener of FIG. 4.

A second embodiment of a hook fastener 110 shown in FIGS. 4 and 5 includes a body 113, keeper 140 and D-shaped ring coupling 112. Like numbers are used to refer to like components in both embodiments. This second embodiment differs from the first in that the axis of rotation 14 of the body 113 relative to the D-shaped ring coupling 112 is acutely inclined to the axis 70 of the cylindrical part 24 and the cylindrical section 21, along which the closure reciprocates. The axis 14 bisects the transverse arm section 36, passes through the apex 71 of the concave face of the hook portion 16 and intersects with the axis 70 at approximately 15 degrees. Accordingly, the axes of the cylindrical section 21 and external face 20 are inclined to one another and the flange 18 is tapered. The cylindrical section 21 forms a neck that extends between the inner flange 18 and a head 72 in which the transverse end face 26 is provided. The head 72 has the same outer diameter as the penannular part of the keeper 140. The penannular face 73 formed by the broader head 72 is parallel to the abutment face 22 and the keeper 140 is located between the faces 73 and 22.

The keeper 140 has like form to the keeper 40 of the first embodiment, but without the nub 47. The D-shaped ring coupling 112 has like form to the ring coupling 12 of the first embodiment, but without the transverse flange 34.

The hook fastener 110 further includes a fastener 75 which is fixed in the end of the cylindrical part 24 of the opening 23 to bear against on end of the spring 60.

The second embodiment works in like manner to the first but (in the absence of the nub 47) it is the tab 44 that serves to limit rotation of the keeper 140 about the axis 70 by abutting the hook part 16.

Aspects of the present invention have been described by way of example only and it should be appreciated that modifications and additions may be made thereto without departing from the scope thereof.

The invention claimed is:

1. A hook fastener comprising:
a body having a base portion and a hook portion extending from an end of the base portion to define a gap between the hook and the base portion;
an external face on the base portion;
an abutment on, or fastened to, the body to project from the external face;
an opening formed in the base portion, the opening having an elongate mouth intersecting the external face;
a closure having a shaft part and a grip part, the shaft part received in the opening, the grip part protruding from the shaft part through the mouth for manipulation by a user;
a spring urging the closure such that the shaft part extends out of the opening into the gap, and
a keeper received to rotate upon the external face, the keeper being located between the abutment and grip part, a slot in the keeper extending parallel to the mouth, the keeper preventing the user retracting the closure from the gap, except when the slot is angularly aligned with the mouth and said keeper has a substantially penannular form with an inner surface part-cylindrical and a part cylindrical outer surface and a tab projecting from the outer surface for providing a handle, and a projection angularly aligned with the tab.

2. The hook fastener of claim 1 wherein the keeper is formed of resilient material and has an inner surface complementary to the external face of the base portion, and said projection extending radially inwardly of the inner surface, said projection being configured for receipt in the mouth thereby providing a detent for locating the keeper in an angular position in which it prevents the user retracting the closure from the gap, said keeper further comprising parallel, spaced apart first and second end faces and said projection extending from said first end face to said second end face.

3. The hook fastener of claim 2 wherein the projection and mouth have first respective edges which substantially abut to restrict rotation of the keeper relative to the body in a first direction, and second respective edges which substantially abut to restrict relative rotation of the keeper in a second direction opposite the first direction, wherein at least one of the first and second edges is radiused or chamfered relative to the others of the first and second edges.

4. The hook fastener of claim 1 wherein said inner face of the keeper is disposed proximate the abutment and said outer face of the keeper is disposed proximate said grip part, and further comprising a nub projecting from said outer surface of the keeper to abut the grip part and restrict rotation of the keeper.

5. The hook fastener of claim 1 further including a D-shaped ring coupling connected to the body and a belt fastened to the ring coupling.

\* \* \* \* \*